Figure 1:
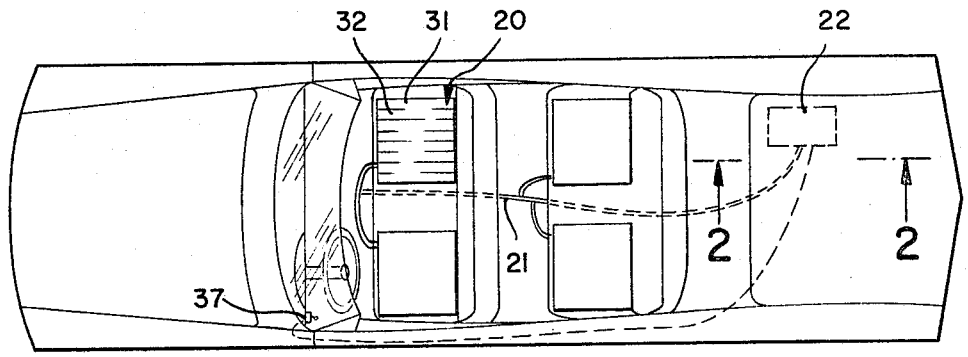

Nov. 29, 1966   H. B. LITTLE   3,288,133
ALTERNATELY INFLATABLE SUPPORTING
SYSTEM FOR THE HUMAN BODY
Filed March 31, 1964   5 Sheets-Sheet 1

INVENTOR.
HUGH B. LITTLE
BY
MAHONEY, MILLER & RAMBO
ATTORNEYS

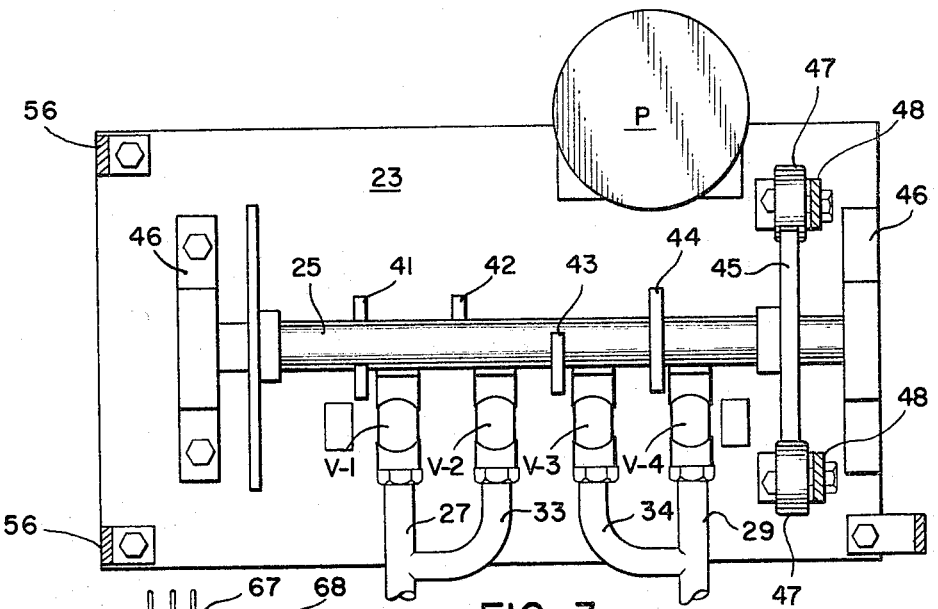
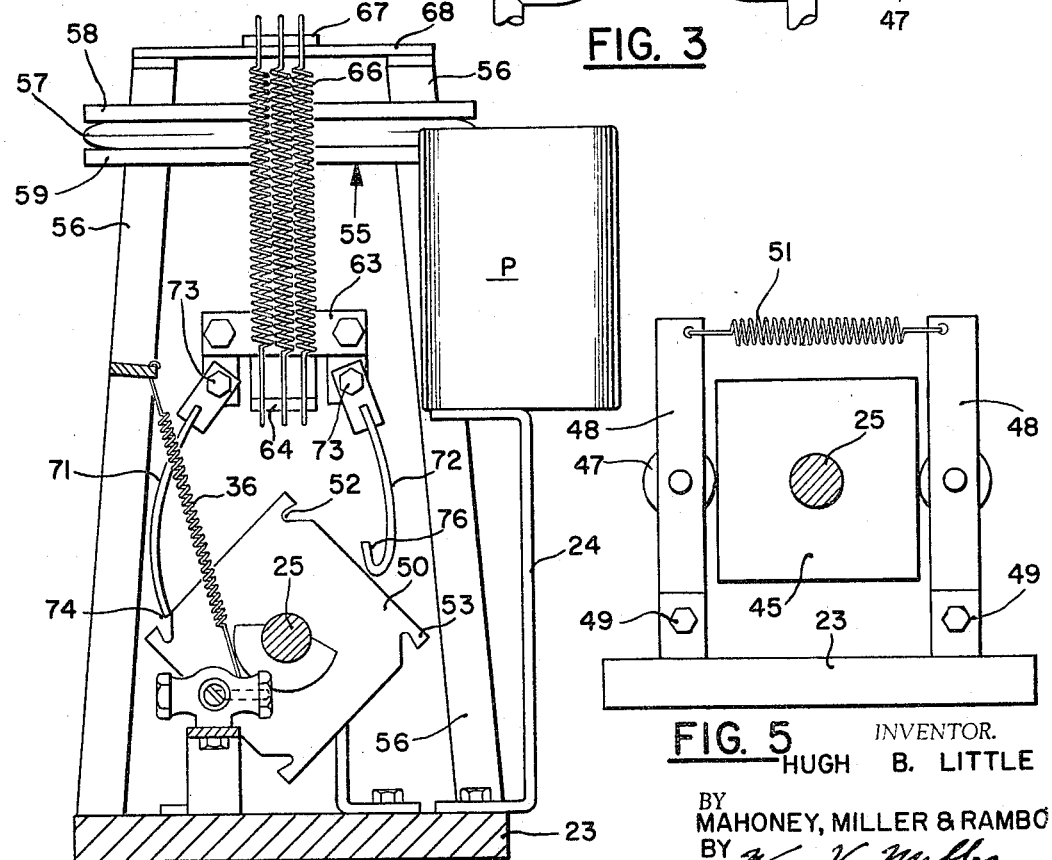

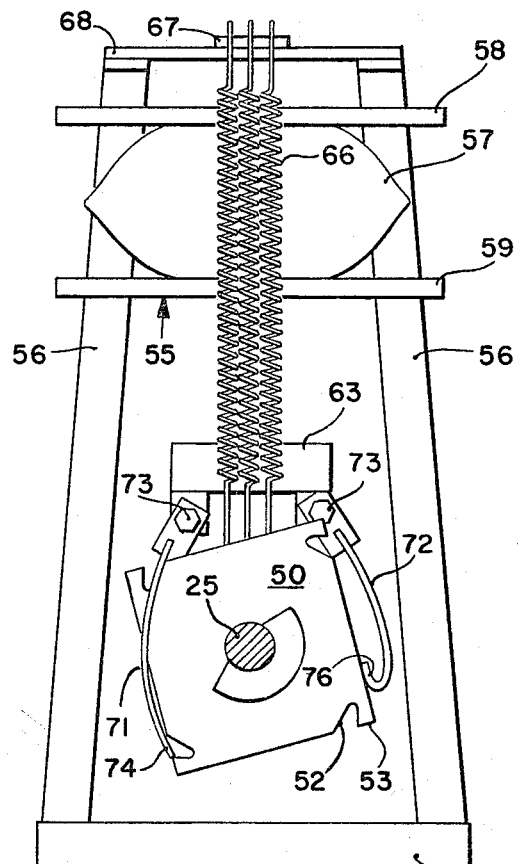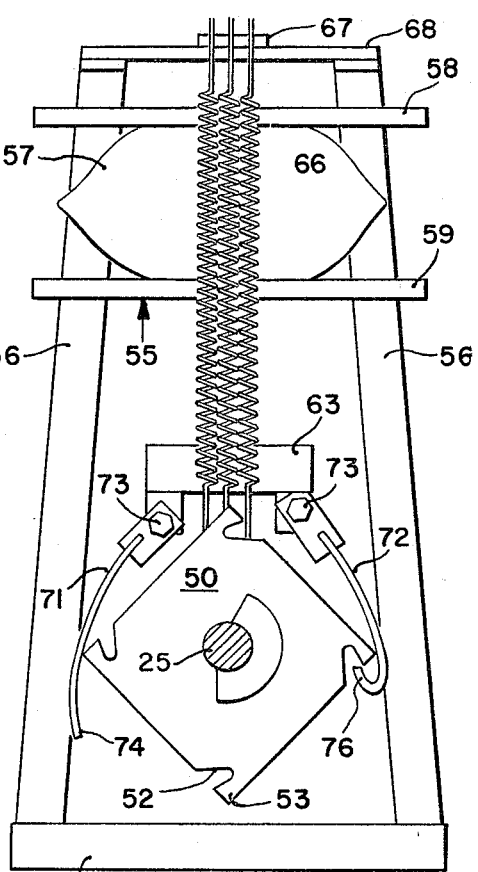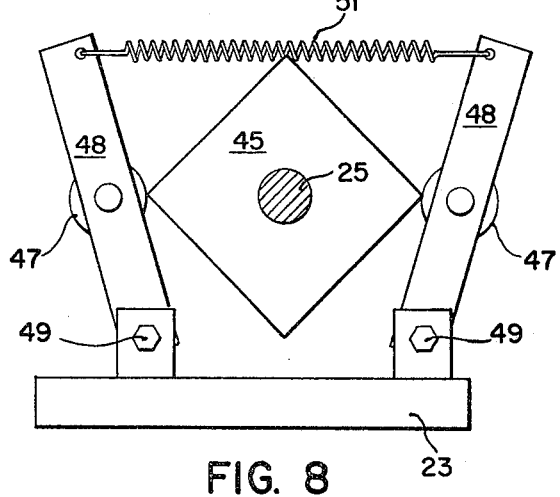

Nov. 29, 1966  H. B. LITTLE  3,288,133
ALTERNATELY INFLATABLE SUPPORTING
SYSTEM FOR THE HUMAN BODY
Filed March 31, 1964  5 Sheets-Sheet 5

INVENTOR.
HUGH B. LITTLE
BY MAHONEY, MILLER & RAMBO
BY *Wm. V. Miller*
ATTORNEYS United States Patent Office 3,288,133
Patented Nov. 29, 1966

3,288,133
ALTERNATELY INFLATABLE SUPPORTING
SYSTEM FOR THE HUMAN BODY
Hugh B. Little, Box 311, Logan, Ohio
Filed Mar. 31, 1964, Ser. No. 356,104
8 Claims. (Cl. 128—24)

My invention relates to a supporting system for the human body. It has to do, more particularly, with a pneumatically actuated and controlled system for supporting certain areas of the human body. In the following description, the invention will be described with reference to a circulatory-aid cushion for supporting the buttocks of a person who maintains a sitting position for a long period of time, specifically with reference to an automobile cushion for use by the driver or a passenger in the vehicle.

As is well known, long automobile trips are extremely tiring to a passenger and even more so to a driver who must sit in a relatively fixed position for long periods. Sitting in such an immobile position results in decrease in circulation, soreness, aches, and even sometimes in skin irritations.

Attempts have been made in the prior art to overcome these adverse effects by providing seat cushions which have vibrating or massaging arrangements. I have found in actual practice that massaging or vibrating cushion surfaces do not overcome the deleterious effects of poor circulation, etc. resulting from immobility since they merely give a surface effect and not improved circulation. Also, I have found that vibrating or massaging surfaces are quite distracting and disconcerting and are, therefore, not desirable insofar as the driver of an automobile is concerned.

According to the present invention, the undesirable effects of the human body being relatively immobile for a long period of time on a supporting surface, such as poor circulation, soreness, aches, body rash, etc., are overcome by providing a relatively firm but yieldable area which supports the selected portion of the body throughout its entire area at all times, but which is made up of alternating supporting surfaces that support the body portion during successive periods. The action of the device embodying this invention is not a pulsating or vibrating action but is a supporting action throughout the portion of the body to be supported but in which contact with the body portion is at successively different surfaces of the body portion.

Also, according to this invention, the contacting or supporting surfaces of the device, for example, a circulatory-aid cushion, are in the form of alternating flexible-wall chambers or cells which extend longitudinally in the direction of extent of the supported body; in other words, in the direction of circulation of blood through the body.

Furthermore, according to this invention, the cells of the circulatory-aid cushion or the like preferably are arranged in two sets of the longitudinal cells, the cells of the respective sets alternating with each other in the weight-supporting or body-suspending action.

In addition, according to this invention, a novel actuating and control system is provided which pneumetically inflates for a preselected period one set of the cells and deflates the other set, and vice versa, to support the body portion by different contacting surfaces throughout the entire area of the cushion.

Various other objects and features of the invention will be apparent.

In the accompanying drawings, I have illustrated my invention embodies in one example but it is to be understood that many other examples could be given.

Figure 2:
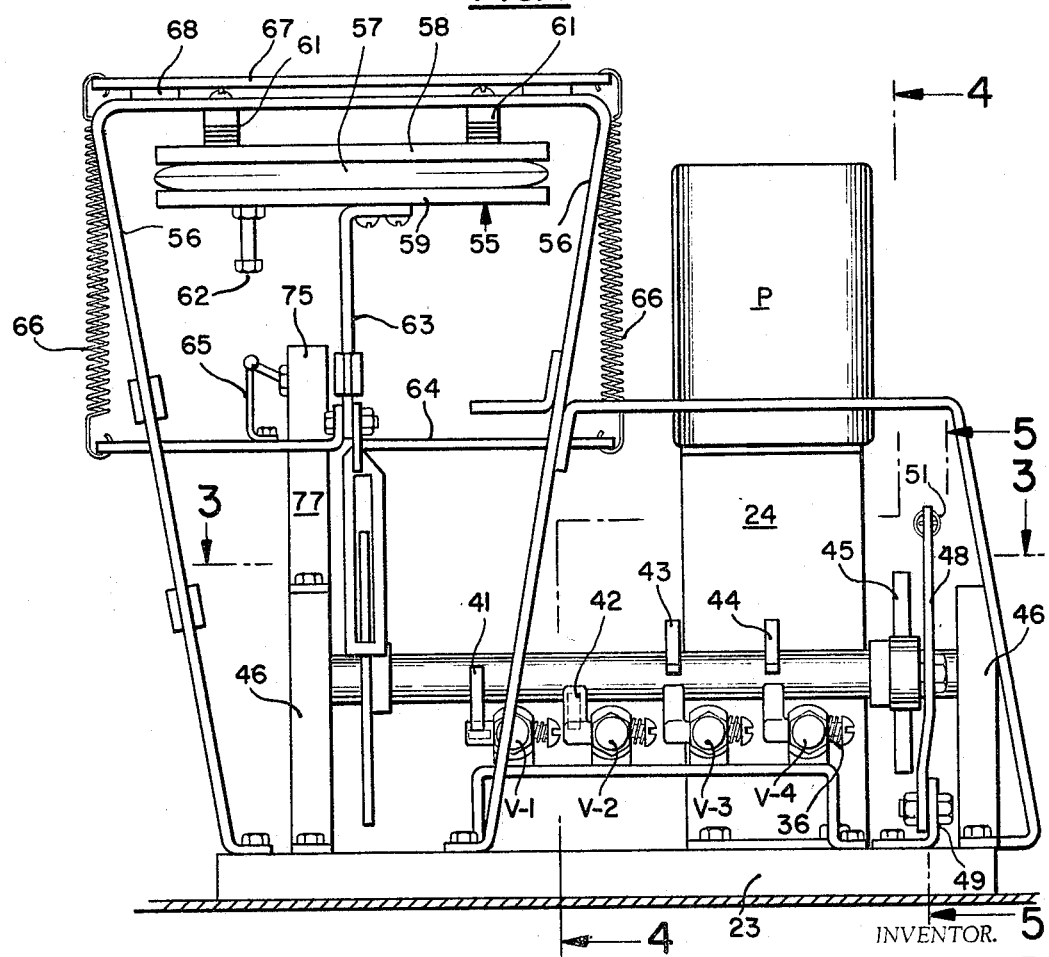
Figure 9:
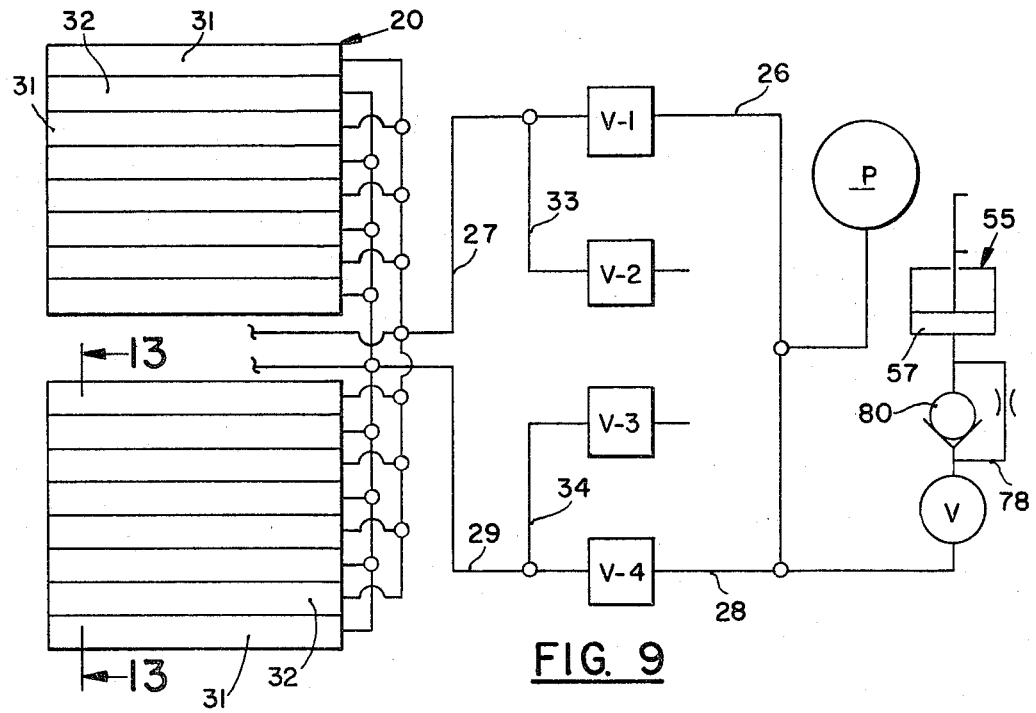
Figure 10:
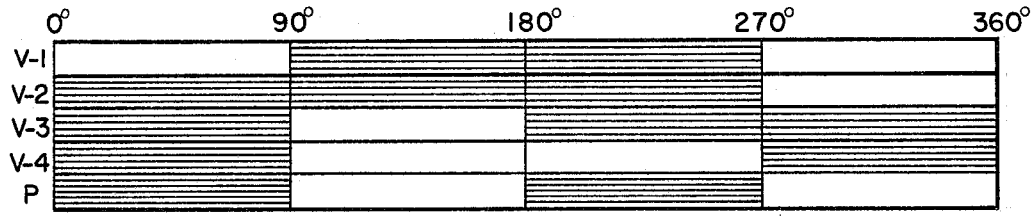
Figure 11:
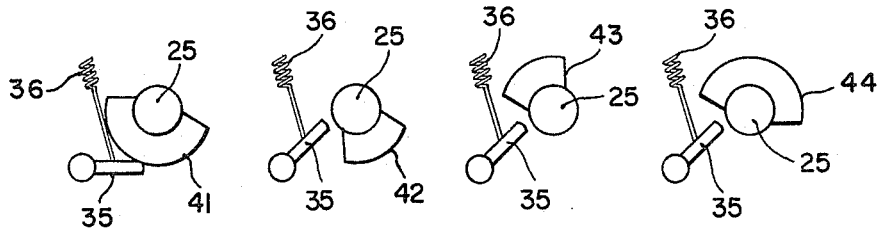
Figure 12:
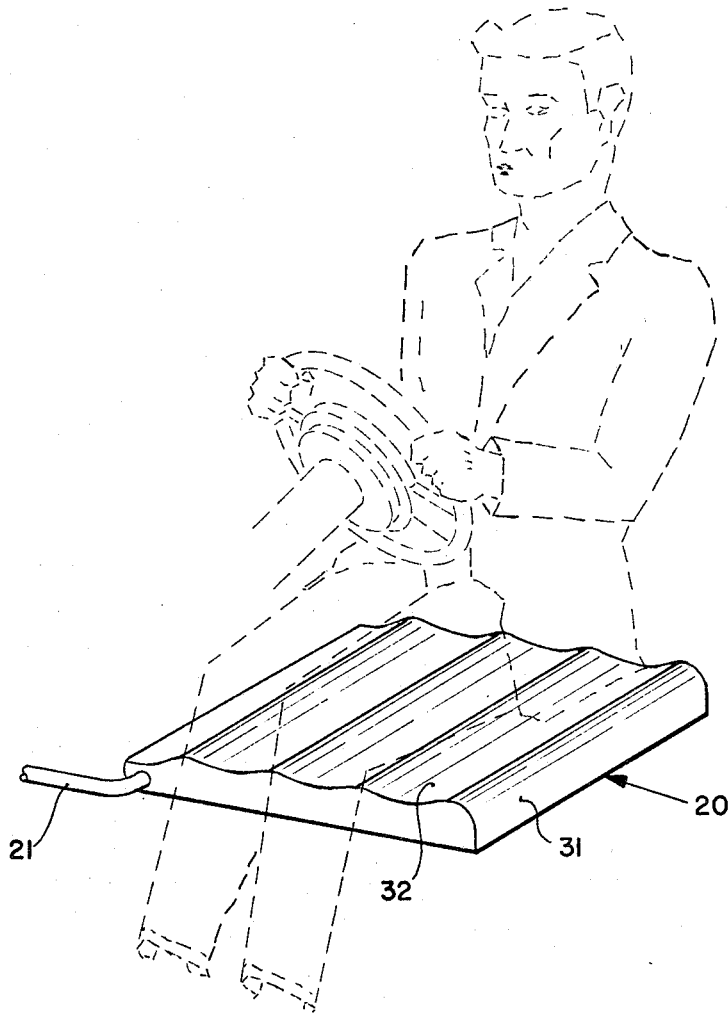
Figure 13:
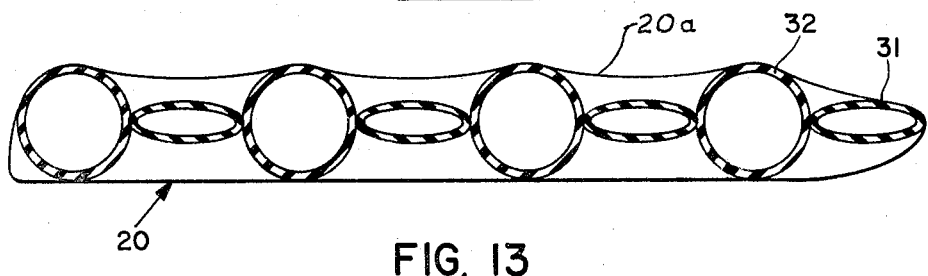

In these drawings:
FIGURE 1 is a schematic view showing the system of my invention applied to circulatory-improving cushions disposed in an automobile.
FIGURE 2 is an enlarged plan view of the pneumatic actuating valve control unit of the system taken from the position indicated at line 2—2 of FIGURE 1.
FIGURE 3 is a vertical sectional view taken along line 3—3 of FIGURE 2.
FIGURE 4 is a vertical sectional view taken long line 4—4 of FIGURE 2.
FIGURE 5 is a vertical sectional view taken along line 5—5 of FIGURE 2.
FIGURE 6 is a schematic view of the bellows actuating device of the system in one of its positions.
FIGURE 7 is a view similar to FIGURE 6 but showing the bellows actuating device in a successive position.
FIGURE 8 is a view similar to FIGURE 5 but showing the cam plate in a successively rotated position.
FIGURE 9 is a diagram of the pneumatic circuit of the system.
FIGURE 10 is a schematic chart illustrating the relative timing of the valves of the pneumatic system.
FIGURE 11 is a schematic view showing the valve control cams of the system.
FIGURE 12 is a perspective view showing one of the circulatory-improving cushions of this invention and indicating the position of a person thereon.
FIGURE 13 is a transverse sectional schematic view taken at the position indicated along line 13—13 of FIGURE 9 through one of the cushions.

With reference to the drawings, the system of this invention is shown diagrammatically in FIGURE 1 applied to an automobile. Preferably for the driver and each passenger there is a circulatory-aid seat cushion according to this invention indicated generally by the numeral 20. These cushions are all connected by suitable flexible conduits 21 into a pneumatic system which includes the main actuating and valve unit or assembly 22. This unit 22 may be disposed in the trunk of the car and is rendered operative or inoperative by means of an electric switch 37 which may be mounted on the dashboard of the automobile.

The unit 22 is illustrated best in FIGURES 2 to 5 and has a flat base or mounting plate 23 and attached to this plate is an upstanding bracket 24 which carries a pneumatic pump or compressor P of a suitable type on its upper end. This pump is of the electrically driven type and is controlled by means of the switch 37 which is connected in circuit therewith. Mounted on the base plate 23 is a bank of control valves indicated respectively as V1, V2, V3 and V4. This set of four valves controls the application of pressure to and exhaust of pressure from each of the seat cushions 20.

As will be explained more in detail later, each cushion 20 has two sets of air cells, the cells of the two sets being respectively indicated by the numerals 31 and 32 (FIGURES 9, 12 and 13). The cells may be enclosed within a suitable flexible cover indicated schematically at 20a. The valves are arranged in two pairs V1, V2 and V3, V4. The first pair of valves controls the group of cells 31 of each cushion but only two of the cushions are shown in FIGURE 9 and the second pair of valves V3, V4 controls the cells 32 of each cushion. The flexible conduits 21 are arranged to provide the connecting lines indicated in FIGURE 9. The valves V1 and V4 receive pressure from the line 26 connected to the pump P. The valve V1 is connected to the cells 31 of the cushions by means of a line 27 and branches to the various cells. The valve V4 receives pressure from the line 28 connected to the pump P. The valve V4 is connected to the cells 32 of the cushions by means of a line 29 and branches to the various cells. Exhaust of the cells 31 is accomplished by means of the valve V2 which is connected to the line 27 by means of a line 33 and exhaust of the cells 32 is accomplished by means of the valve V4 which is connected to the line 29 by means of a line 34.

The valves V1, V2, V3 and V4 are controlled, respectively, by the cooperating cams 41, 42, 43, and 44, which are indicated in FIGURE 3. As shown in FIGURE 11, each valve is provided with a finger 35 which is biased into engagement with its associated cam by means of a spring 36. The cams are carried in axially spaced relationship adjacent the valves for cooperation therewith by means of a cam shaft 25 shown best in FIGURE 3. This cam shaft is supported longitudinally of the plate 23 and in spaced parallel relationship thereabove by means of the upright bearing standards 46 which are attached to the base plate 23.

In addition to the valve-actuating cams 41, 42, 43, and 44, the shaft 25 also carries a power or stepping cam 45. This cam is keyed to the shaft 25 adjacent one end and is of square outline. Its edge is engaged by a pair of cam followers or rollers 47 which are carried on the respective arms 48 at opposite sides of the shaft 25. These arms 48 are pivoted to the base plate 23 at 49 for swinging movement laterally of the shaft and are pulled toward each other by means of a spring 51 connected between their upper ends. Thus, the rollers 47 are biased into contact with the edge of the cam 45 at opposed points.

The opposite end of the shaft 25 has keyed thereon an actuating cam 50 which is of square form and which has a notch 52 in its edge adjacent each corner that forms a corner tooth 53. The cam 50 is rotated or actuated step-by-step by means of an actuating fluid-pressure unit in the form of a bellows unit 55. This unit 55 is supported by an upstanding supporting frame which is attached to the base plate 23 and which includes a pair of laterally spaced supporting yokes 56. The bellows itself comprises a flexible tube or bag 57 which is disposed between a fixed upper rigid plate 58 and a vertically movable lower plate 59 mounted for movement between the spaced yokes 56. The plate 58 is rigidly fastened in a fixed vertical position within the upper portions of the yokes by means of spacer and bolts 61 and the upper side of the bellows is attached to the lower surface thereof as by adhesive. The lower side of the bellows is similarly attached to the upper surface of the plate 59. The movable plate 59 is provided with an adjustable depending bolt 62. It is also provided with a depending inverted T-shaped bracket 65 substantially at the center thereof in substantially the same transverse vertical plane as the cam 50. The lower end of this bracket carries the oppositely extending rigid horizontal arms 64. The outer ends of these arms 64 are connected to upwardly extending tension spring 66 which have their upper ends connected to the outer ends of a bar 67 that extends longitudinally in substantially the same vertical plane as the shaft 25, being carried by the transverse support bars 68 which rest on the upper ends of the yokes 56. Thus, the springs 66 tend to pull the plate 59 upwardly so as to collapse the bellows 57 between the plate 59 and the plate 58. This also lifts the bracket 63 to its uppermost position.

The bracket 63 is provided at its opposed ends, at its lower branch, with cam-actuating fingers 71 and 72 which are pivoted thereto at 73. The finger 71 is a push finger and its lower blunt end 74 is adapted to engage in the successive notches 52 in the cam 50. The finger 72 is a pull finger and has a lower hook-shaped end 76 that is adapted to hook onto the successive teeth 53 of the cam 50. The fingers 71 and 72 normally are on opposite sides of the cam 50 in engagement with the edge thereof at opposed points.

When the bellows 57 is collapsed (FIGURE 2) due to the springs 66 pulling the plate 59 upwardly at the same time the bellows is exhausted, an actuating lug 65 on one of the arms 64 engages and closes an electric switch 75 which is supported by a fixed upstanding support 77 from the standard 46. This switch 75 is of the toggle type and is connected in the circuit with the pump P to turn it on and off. When the bellows 57 is inflated in response to pressure supplied thereto and moves the plate 59 downwardly against the force of the springs 66, the switch lever is engaged by the bolt 62 to open it.

The bellows chamber 57 is connected in the pneumatic circuit in the manner indicated diagrammatically in FIGURE 9. It is connected to the pressure line 28 through a ball check valve 80 and an adjustable throttle valve V. A restricted bypass 78 is provided in the line 28 around the check valve 80.

In FIGURE 10, a chart of the relative periods of operation of the valves V1, V2, V3, and V4 is given, these valves being controlled by rotation of the cams 41, 42, 43, and 44. Also, the period of operation of the pump P by the switch 75 is given. In each horizontal line or row of the chart, the blank spaces opposite each valve number indicate when that valve is open and the shaded spaces indicate when that valve is closed. Similarly, the blank spaces in the pump row indicate when the pump is inoperative and the shaded spaces indicate when it is operating.

As previously indicated, the circulatory-aid cushion 20 is made up of groups of air cells 31 and 32, as shown in FIGURES 1, 12, and 13, with the cells of the respective groups alternating. These cells may be in the form of elongated tubes which may be of flexible rubber or plastic. Two groups of cells are shown but it is to be understood that different numbers of groups can be used. However, in each instance, the tubes of the respective cells will be arranged in alternating or sequential relationship and each group of cells will have its individual cells arranged throughout substantially the overall area of the cushion so that at any selected period the inflated cells of one group will be the supporting mechanism throughout the overall area of the cushion whereas the cells of the other groups will be deflated and will not be functioning as supports. Also, I have found that it is important that the elongated cells 31 and 32 extend from front to rear, as indicated in FIGURE 12, relative to the sitting position of the body, that is, longitudinally of the body in the direction of general circulation of the blood so as to aid in that circulation. I have found that if they extend transversely of the body, there is a tendency to interfere with the circulation rather than to aid it.

In describing the operation of the cushion and system, I will indicate that the body is suspended on four alternate air chambers that extend in the same general direction as the legs but it is to be understood that a different number of chambers may be provided. It is preferred to deflate alternate sets or groups of chambers at intervals of about three and one-half to four minutes but this may be varied. However, the period is sufficiently long that a pulsating action is not obtained. A successive group of cells is inflated before the previously inflated group is deflated.

In the operation of this system, the main control dash switch 37 is switched on to render the whole system operative. The control switch 75 will be on at this time because the springs 66 raise the switch-actuating lug 65 to the position shown in FIGURE 2 when the bellows 57 is vented and collapsed. The air compressor or pump P now starts and pumps air into the pressure lines 26 and 28. The cam shaft actuating fingers 71 and 72 will consequently be moved from their uppermost positions shown in FIGURE 4 to their lowermost positions shown in FIGURE 6, due to the bellows 57 being inflated, and either the valve V1 or the valve V4 will be in its open position, referring to the chart of FIGURE 10. The power cam 45 will locate the shaft 25 in this valve-operating position since the cam is gripped between the arms 48, as indicated in FIGURE 5. This will also locate the cam 50 properly angularly of the axis of the shaft, as indicated in FIGURE 4, since it is keyed on the shaft in predetermined angular relationship with the cam 45.

Assuming the valve V1 is open when the dash switch 23 is turned on and the pump P is started, air under pressure flows through the open valve V1 from the pressure line 26, through the lines 27 to the cushion chambers 31. All the other valves V2, V3, and V4 are closed at this time as indicated in FIGURE 10. Air under pressure also passes from the pump pressure line 26 through the line 28, through the pressure-regulating valve V, through the check valve 80, into the bellows 57 so as to expand the bellows. The valve V may be set to open only when a predetermined pressure has been reached in the cushion chambers 31 which will be the pressure built up in the line 26. Expansion of the bellows in this manner and at this time will force the actuator bracket 63 downwardly from the position of FIGURE 4 to the position of FIGURE 6, This causes the finger 71 to engage the cam 50, to turn it through one-eighth of a turn which turns the cam shaft 25 similarly and the cam 45 along with it when the latter power cam takes over and is quickly snapped from the position of FIGURE 8 into a new position advanced one-eighth of a turn farther, indicated in FIGURE 5, this being accomplished by pressure exerted by the arms 48. At this instant, the bolt 62 strikes the switch lever and opens the switch 75 to turn off the pump P. Snapping of the cam 45 into the position indicated above also turns the cam 50 and the shaft 25 to close the valve V1, open the valves V3 and V4, but not to open the valve V2 as indicated in FIGURE 10. The valve V3 will bleed the cushion chambers 32 and it, with the valve V4, will bleed the bellows 57. The bleeding of the bellows 57 will be slow since the exhaust fluid will have to escape through the restricted bypass 78 and, as previously indicated, this preferably will require three and one-half to four minutes. Bleeding of the bellows 57 allows the springs 66 to lift the actuator bracket 63 and permits the hook 76 to engage a lug 53 of the cam 50, as indicated in FIGURE 7, and turn the cam and the shaft 25, this turning action taking the three and one-half to four minute period required to bleed the bellows so as to properly time the inflation and deflation of the respective chambers 31 and 32. The final turn of the shaft 25 brought about by the arms 48 snapping the cam 45 into its advanced position, after release of the cam 50 by the finger 72, closes the valve V3 but the valve V4 remains open as indicated in FIGURE 10. At this time, the switch 75 is again closed by contact of the lug 65 with its lever so as to start the pump P. Since the valve V4 is open, the cushion chambers 32 are filled through the lines 28 and 29 and pressure is supplied to the bellows 57 through the valve V. This causes the actuator bracket 63 to be forced downwardly due to expansion of the bellows and again causes the finger 71 to engage the cam 50 and rotate it, it being understood that at this time the valve V4 is the only one open, as indicated in FIGURE 10. After the shaft 25 is turned by the cam 50 sufficiently, the power cam 45 takes over and snaps the shaft 25 through another one-eighth turn. This then closes the valve V4, it being understood that the chambers 32 are fully inflated at this time, and opens the valves V1 and V2 so as to deflate the chambers 31 and bellows 57. The snapping or quick turn action by the power cam 45 is for quick opening or closing of the valves.

The system is now set for a repeat of the above-indicated sequence of operations.

The system given as an example is associated with a circulatory-aid cushion. With each cushion, the weight of the body is suspended on four alternate chambers of air, which may be about eighteen inches long, that are parallel with the legs. Preferably, about every three and one-half to four minutes the deflated alternate chambers 32 inflate and at the moment they are fully inflated, the other inflated chambers 31 deflate. The cycle is repeated every three and one-half to four minutes. This maintains circulation because the chambers are parallel with the general direction of the main circulatory system of the body.

It will be apparent from the above description that I have provided a human body-supporting system which includes a supporting pad or cushion that has elongated inflatable and deflatable cells. The cells extend in the direction of circulation of the blood so as to aid in that circulation rather than interfere with it. The cells are divided into separate groups but the cells of each group are in sufficient number and arranged so that they are distributed throughout the area of the body to be supported. However, the cells of the different groups are inflated into supporting position during successive periods while the cells of the other group or groups are deflated. Thus, the areas of contact with the body are varied at successive intervals which will aid in circulation and prevent soreness and aches. It is important to understand that the device is not a vibrating or massaging device but is a shifting of supporting surfaces which is not distracting and disconcerting, merely being a change from one set of contact of areas to another set. The control arrangement is such that the shifting from one supporting group of cells to the other occurs at the proper intervals and each group is maintained in supporting condition for a proper period.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described this invention, what is claimed is:

1. A circulatory-aid human body supporting system comprising a cushion having at least two groups of inflatable and deflatable cells with the cells of each group being in sufficient number and arranged so that they are distributed throughout the overall area of the cushion and with the cells of the different groups alternating with each other, a pneumatic pressure unit for supplying pressure to the various cells, and control means connected between said unit and said groups of cells for supplying pressure to one group of cells to fully inflate those cells and then to exhuast pressure from the other group of cells to deflate those cells to provide for support of the body successively by the different groups of cells, said cells of the cushion being elongated and extending in the general direction of the body adapted to be positioned thereon so as to aid in circulation of blood in the body, the cells of each group being spaced laterally and the cells of the one group alternating laterally with the cells of the other group, said control means comprising a plurality of flow control valves, cam means for operating said valves, and means for actuating said cam means at predetermined intervals, said cam means comprising a cam shaft having a plurality of cams axially spaced therealong for cooperating with a corresponding number of valves, said actuating means comprising means for rotating said shaft at predetermined intervals and including a reciprocable actuator having fingers, projections on said shaft in cooperative relationship with said fingers and adapted to be engaged by said fingers to rotate it, a bellows connected to said actuator for controlling reciprocation thereof, and means for compressing and expanding the bellows to reciprocate the actuator.

2. A system according to claim 1 in which said last-named means includes springs connected to said actuator for biasing the actuator in a direction to compress the bellows.

3. A system according to claim 1 in which said last-named means includes a connection between said pressure unit and said bellows and embodying a pressure-regulating valve for connecting said pneumatic pressure unit to said bellows when the pressure in the inflated group of cells reaches a predetermined degree to provide pressure for expanding the bellows, and a restricted bypass for exhausting pressure from said bellows and controlled by one of said cam-operated valves.

4. A system according to claim 3 in which said pneumatic pressure unit is electrically operated, and electric switch for controlling said unit, said actuator having means for operating said switch.

5. A system according to claim 4 in which said cam-actuated valves comprise a pair of valves connected to each of said groups of cells and consisting of a pressure valve and an exhaust valve said pressure valve being connected to said pneumatic pressure unit and also to said pressure-regulating valve.

6. A system according to claim 5 in which a cam keyed on said cam shaft and having projections on said cam shaft engaged by the fingers of the actuator, said shaft also having a power cam keyed thereto which has an angular peripheral form, and spring-biased arms for engaging the periphery of the latter cam to snap it into successive rotative positions about the axis of the shaft.

7. A system according to claim 6 in which the first cam is of square form with notched corners, and said fingers of the actuator engage the cam at opposed corners and comprise push and pull members at the opposed corners.

8. A system according to claim 7 in which the power cam is of square form and the spring-biased arms are pivoted at opposite sides of the cam and carry cam-followers for engaging said edges and gripping the cam therebetween, the arms being biased toward each other into engagement with the cam by a spring connected therebetween.

References Cited by the Examiner
UNITED STATES PATENTS

| | | | |
|---|---|---|---|
| 2,684,672 | 7/1954 | Summerville | 128—33 |
| 3,148,391 | 9/1964 | Whitney | 5—348 |
| 3,179,106 | 4/1965 | Meredith | 128—24 |
| 3,199,124 | 8/1965 | Grant. | |

RICHARD A. GAUDET, *Primary Examiner.*

L. W. TRAPP, *Assistant Examiner.*